US008126757B2

(12) United States Patent
Haller et al.

(10) Patent No.: US 8,126,757 B2
(45) Date of Patent: Feb. 28, 2012

(54) METHOD AND SYSTEM FOR SELECTING PARTICIPANTS IN AN ONLINE COLLABORATIVE ENVIRONMENT

(75) Inventors: Jochen Haller, Karlsruhe (DE); Orestis Terzidis, Schwetzingen (DE)

(73) Assignee: SAP AG, Waldorf (DE)

( * ) Notice: Subject to any disclaimer, the term of this patent is extended or adjusted under 35 U.S.C. 154(b) by 2063 days.

(21) Appl. No.: 11/286,849

(22) Filed: Nov. 22, 2005

(65) Prior Publication Data
US 2007/0124191 A1    May 31, 2007

(51) Int. Cl.
*G06Q 10/00*    (2006.01)
(52) U.S. Cl. .................... 705/7.13; 705/301
(58) Field of Classification Search ............ 705/7.13, 705/301
See application file for complete search history.

(56) References Cited

U.S. PATENT DOCUMENTS

2002/0156797 A1* 10/2002 Lee et al. ................ 707/200
2005/0177561 A1*  8/2005 Ramanathan et al. ........ 707/3

OTHER PUBLICATIONS

Sue R. Faerman, David P. McCaffrey, David M. van Slyke, "Understanding Interorganizational Cooperation: Public-Private Collaboration in Regulating Financial Market Innovation", May-Jun. 2001, INFORMS, vol. 12, No. 3, 372-388.*

* cited by examiner

*Primary Examiner* — Beth V Boswell
*Assistant Examiner* — William Porter
(74) *Attorney, Agent, or Firm* — Blakely, Sokoloff, Taylor & Zafman

(57) ABSTRACT

A method and system to select one or more participants in an online collaborative process are provided. The method includes receiving selection information and identifying a potential list of the participants from an information system based on the selection information, the information system containing transaction data relating to prior collaboration processes with the participants. In particular, the method establishes trust parameters for each of the participants, the trust parameters representing at least qualifications, credentials or trustworthiness properties of the participants. The establishing of trust parameters includes identifying the trust parameters and quantifying the trust parameters. The trust parameters are identified by performing a search for relevant ones of the transaction data that matches the selection information, the selection information relates to trustworthiness properties of the participants. The trust parameters are further quantified by applying the relevant ones of the transaction data with statistical algorithm to compute a value that measures the trustworthiness properties of the participants.

23 Claims, 3 Drawing Sheets

METHOD AND SYSTEM FOR SELECTING PARTICIPANTS IN AN ONLINE COLLABORATIVE ENVIRONMENT

FIELD OF THE INVENTION

An embodiment relates generally to the field of online collaboration. More particularly, an embodiment relates to a method and a system for selecting participants based on historical collaboration information provided by trusted parties.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects and offer services that could not be provided by individual organizations.

However, with the adoption of online collaboration, the boundary between homogeneously administered, trusted private networks and the uncontrollable and insecure public networks is blurred. Indeed, traditional security measures, such as techniques based on access control, are no longer sufficient in a dynamic collaborative environment.

Reputation-based systems have emerged as a method for stimulating adherence to electronic contracts and for fostering trust amongst strangers in a collaborative environment, such as an e-commerce transaction. A reputation-based system gathers, distributes and aggregates feedback about behavior of participants. Reputation mechanisms can provide an incentive for honest behavior and help people make decisions about who to trust. Past experience with participants can be projected into the future, giving a measure of their trustworthiness. Without such systems, where strangers are interacting in an online collaborative environment, the temptation to act deceptively for immediate gain could be more appealing than cooperation.

However, reputation-based systems still encounter significant challenges. Feedback can be deleted if a participant changes name. Indeed, a dishonest participant can use this to start fresh every time it builds up a bad reputation. People may not bother to provide feedback at all, negative feedback can be difficult to elicit and it is difficult to ensure that feedback is honest. Improvements in such system for online collaboration are needed.

SUMMARY OF THE INVENTION

According to one aspect of the invention, there is provided a method to select one or more participants in an online collaborative process. The method includes receiving selection information and identifying a potential list of the participants from an information system based on the selection information. The information system contains transaction data relating to prior collaboration processes with the participants. In particular, the method establishes trust parameters for each of the participants, the trust parameters representing at least qualifications, credentials or trustworthiness properties of the participants. The establishing of trust parameters includes identifying the trust parameters and quantifying the trust parameters. The trust parameters are identified by performing a search for the transaction data that matches the selection information relating to the trustworthiness properties of the participants. The trust parameters are further quantified by applying the transaction data with statistical algorithm to compute a value that measures the trustworthiness properties of the participants.

According to a further aspect of the present invention, there is provided a system to select one or more participants in an online collaborative process. The system includes one or more information modules for providing transaction data relating to prior collaboration processes with the participants and a recommendation module for determining a list of the participants based on the transaction data. In particular, the system establishes trust parameters for each of the participants that represent at least qualifications, credentials or trustworthiness properties of the participants. The system establishes the trust parameters for each of the participants by identifying the trust parameters and quantifying the trust parameters. The identifying of the trust parameters comprises searching the transaction data that relates to trustworthiness properties of the participants. The quantifying of the trust parameters comprises applying the transaction data with statistical algorithm to compute a value that measures the trustworthiness properties of the participants.

Other features of the invention will be apparent from the accompanying drawings and from the detailed description that follows.

DESCRIPTION OF THE DRAWINGS

An embodiment of the present invention is illustrated by way of example and not limitation in the figures of the accompanying drawings in which like references indicate similar elements and in which.

DETAILED DESCRIPTION

Figure 1:
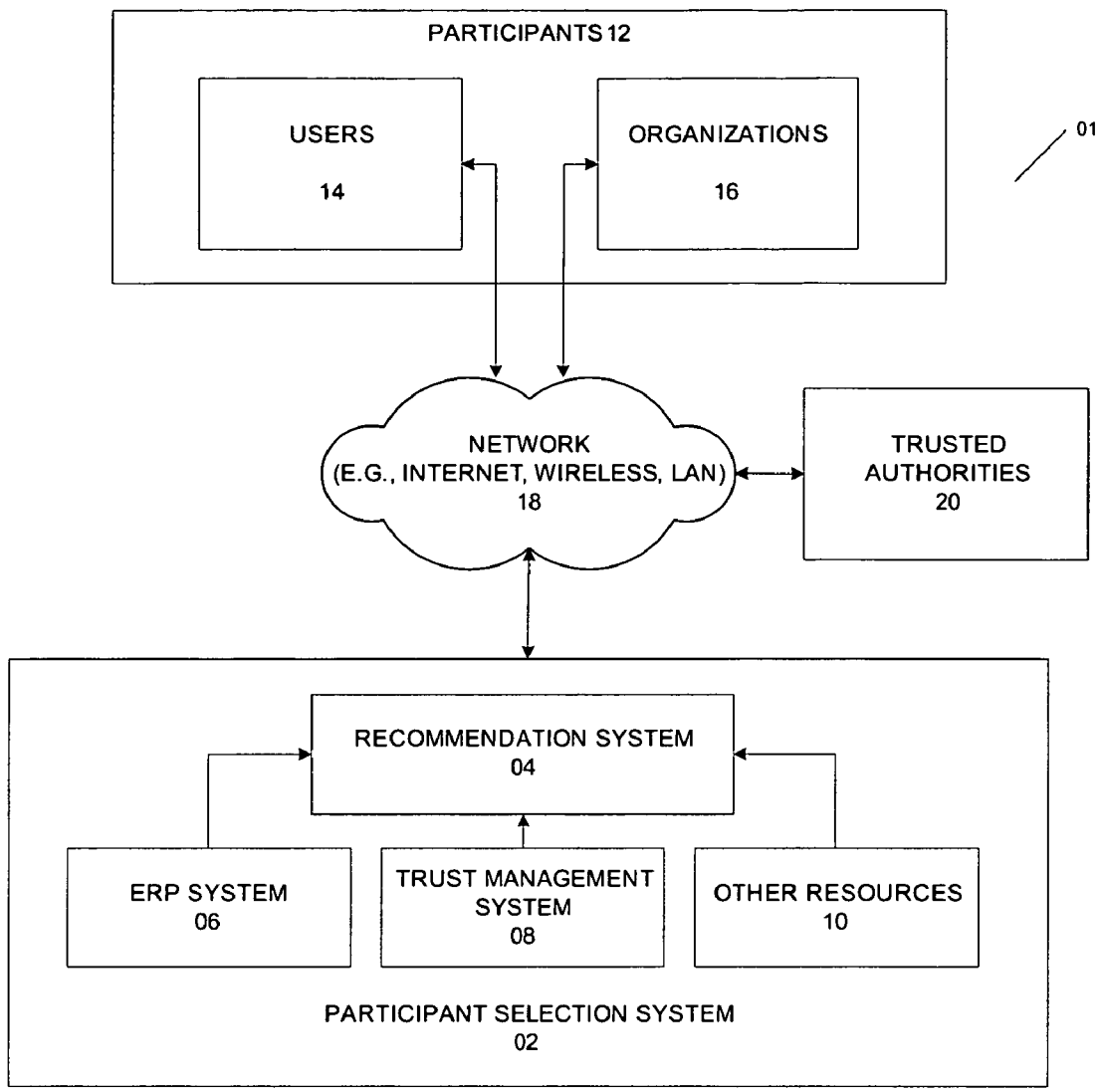
FIG. 1 is a network diagram depicting a system for providing a list of recommended participants in accordance with one exemplary embodiment of the invention.

A method and system for selecting participants in an online collaborative environment. In the following description, for purposes of explanation, numerous specific details are set forth in order to provide a thorough understanding of an embodiment of the present invention. It will be evident, however, to one skilled in the art that the present invention may be practiced without these specific details.

As more organizations embrace online collaboration, the security between organizations becomes increasingly critical. By nature of the architecture of an online collaborative system, the collaborative system often provides an open and unrestricted environment for content sharing. However, this openness also makes it an ideal environment for attackers to spread malicious content. In addition, in a dynamic collaborative environment which involves participants from different security domains, traditional security measures are no longer able to cope with the security demands. Indeed, traditional security measures often involve authorizing access based on identities of the participants. Such measures become unrealistic as the identities of the participants are often unknown prior to the execution of the collaboration process.

An alternative solution to hard security system is soft security system which is based on characteristics or properties of the participants. In one embodiment of the present invention, a reputation-based system is introduced to establish trust among participants without prior knowledge of each other. In general, a reputation-based system uses feedback from other participants or trusted authorities to assess the trustworthiness of the peers in the community.

However, reputation-based system still encounters significant challenges. Feedback can be deleted if a participant changes its name. Indeed, a dishonest participant can use this to start fresh every time it builds up a bad reputation. People may not bother to provide feedback at all, negative feedback can be difficult to elicit and it is difficult to ensure that feedback is honest.

The invention uses trusted internal systems rather than external systems and data. Therefore, instead of objective reputation, an organization rather assembles recommendation from the subjective, own data within own systems. The invention outlines an approach for leveraging one or more trusted systems to improve the quality of the recommendation-based system. One example of such trusted systems is an Enterprise Resource Planning (ERP) System. ERP systems typically handle the manufacturing, logistics, distribution, inventory, shipping, invoicing and accounting of an organization. In addition, ERP systems are designed to manage many of the business activities of the organization, such as sales, delivery, billing, production, inventory management and human resource management. Consequently, ERP systems contain a wealth of information relating to transactions with internal and external participants. In addition, the properties or performance of a participant can be observed from such transaction data. For example, the transaction data can provide information relating to financial well-being and operational efficiency of a participant. Therefore, the ERP system is a valuable source of data for deriving variables that represent the credentials, qualifications or trustworthiness of the participant.

Although an ERP system is often called the back office system indicating that customers and the general public are not directly involved, ERP system can be integrated with other front office systems, such as a Customer Relationship Management (CRM) system or a Supplier Relationship Management (SRM) system. Indeed, the ERP system contains a wealth of information relating to collaboration that an organization normally participates. In addition, the information in an ERP system is usually maintained privately by the organization or a trusted third party. Therefore, the integrity of the information is constantly maintained. Therefore, the invention provides a novel way to select a participant or evaluate the trustworthiness of a participant by taking past transactions with participants and similar data into account.

It will be noted that though the invention uses an ERP system, it is not limited to such. Other systems or applications that provide reliable historical transaction data of the participants may be used. In addition, the present invention may combine an ERP system with other systems to select the participants.

FIG. 1 is a network diagram depicting a participant selection system 01 for selecting participants in accordance with one exemplary embodiment of the invention. A participant selection system 02 is connected to the participants 12 (such as users 14 and organizations 16) and trusted authorities 20 via a network 18 (e.g. Internet, wireless and LAN).

The trusted authorities 20 are entities that have the authority to verify the qualifications of the participants 12. For example, the trusted authorities 20 may include government organizations, regulatory boards and public or private reviewing communities. In some case, the trusted authorities 20 are certificate authorities (CA) that issue and manage security credentials and public keys for message encryption in a public key infrastructure environment.

In one embodiment of the invention, the participant selection system 02 contains a recommendation system 04, an ERP system 06, a trust management system 08 and other resources 10. The recommendation system 04 establishes the trust parameters that represent the qualifications, credentials or trustworthiness of the participants 12. The recommendation system 04 identifies and quantifies the trust parameters based on data from the ERP system 06, trust management system 08 and other resources 10. As described previously, the ERP system 06 often contains a wealth of historical transaction data of the participants 12. For example, information relating to the financial status, inventory management, product quality and customer service of the participants 12. Indeed, past experience with participants can be projected into the future, giving a measure of their trustworthiness.

In one embodiment of the invention, the trust management system 08 comprises information of the participants 12 which have been verified by the trusted authorities 20, such as a CA in a public key infrastructure. In addition, the trust management system 08 may be provided and managed by the trusted third party. Therefore, the trust management system 08 serves as another data source which the recommendation system 04 may use to establish the trust parameters of the participants 12. In addition, the recommendation system 04 may use information provided from other resources 10, such as a CRM system and SRM system.

Figure 2:
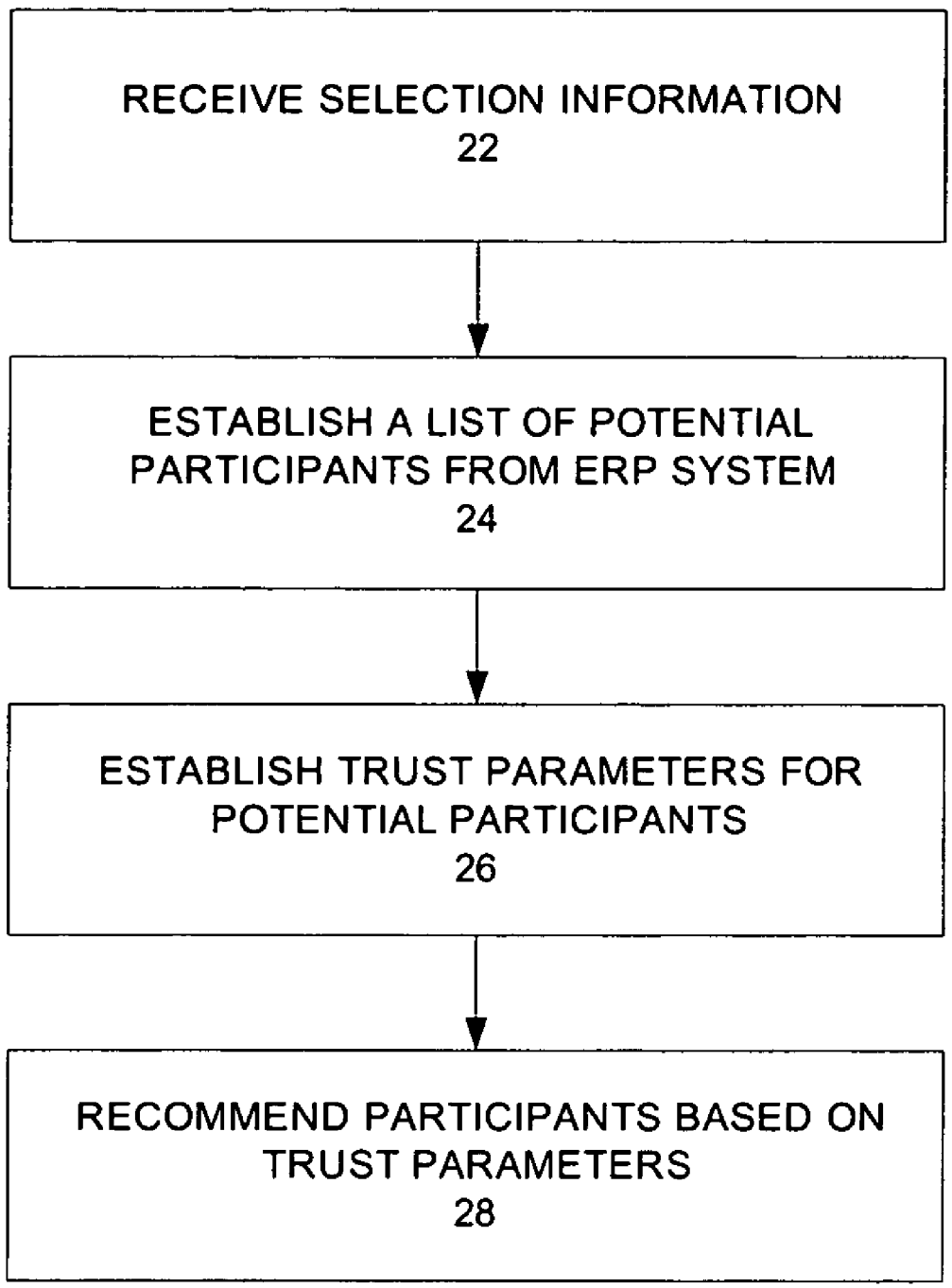
FIG. 2 is a flowchart illustrating a method to provide a list of recommended participants in accordance with one exemplary embodiment of the invention.

FIG. 2 is a flowchart illustrating a method to provide a list of recommended participants in accordance with one exemplary embodiment of the invention. The process begins at block 22 when the participant selection system 02 receives selection information from a requestor. For example, the requestor may be seeking for a supplier that can provide a rotary pump immediately to meet a production deadline. Therefore, the objective of the search is to locate participants who can provide rotary pump with the shortest delivery time period.

Next (block 24), the recommendation system 04 establishes a list of potential participants from the ERP system 06 based on the search criteria. The relevant search relates to the profile of the participants, such as the type of products manufactured or supplied. The recommendation system 04 may apply a string searching algorithm or heuristic searching algorithm to locate the potential participants. It will be noted that other searching algorithms may be used to locate the potential participants from the ERP system.

In this example, the recommendation system 04 may use a search term like "pumps" or "rotary pumps" or "lobe pumps" to locate the potential participants. In addition, the recommendation system 04 may maintain a library or database that further expands the vocabulary of the search term provided. For example, a user may indicate "rotary pump" as the search term. However, the recommendation system 04 is able to further expand the search to other related terms such as "rotary lobe pump", "rotor pump", "bi-winged rotor pump" or other terms which are known in the industry. In this example, the library contains a list of product names and specifications which are further classified or grouped together. Stated differently, the library functions like a thesaurus. Therefore, the library is able to provide the recommendation system 04 with other terminologies that are associated with the search criteria. The library may rely on the ERP system, such as data relating to technical or product specification, to establish the relevant terms.

At block 26, the recommendation system 04 establishes the trust parameters for each potential participant. The process includes searching the ERP system 06 for relevant transaction logs that reveal the properties of the potential participants that are associated with the trust parameters. In this case, the trust parameter is the ability of the potential participants to provide the rotary pump immediately. It will be noted that similar search techniques as described may be applied. For example, the recommendation system 04 may apply string searching algorithm or heuristic searching to discover transaction logs of the potential participants relating to delivery. In addition, the recommendation system 04 may expand the search by leveraging the library for additional terms relating to timely delivery. It will be noted that although the search processes (blocks 24 and 26) are illustrated separately, these processes may be further combined and performed as a single search process.

Once the relevant transaction logs are discovered, the recommendation system 04 further quantifies the trust parameters. That is, the recommendation system calculates the trust parameters from the transaction data. The computed trust parameters provide a measurement of the trustworthiness properties of the participants. In one embodiment, statistical algorithms such as Arithmetic mean, Geometric mean, Beta distribution function or Markov process are used. Indeed, various types of mathematical, computing or artificial intelligence techniques may be applied to derive a trust parameter that quantifies the trustworthiness properties of the participant. A detailed example is further illustrated in FIG. 4 using Beta distribution function.

When the trust parameters have been identified for each possible participant, the recommendation system 04 provides the list of recommended participants (block 28). In one embodiment, the list of recommended participants may be prioritized in certain order accordingly to the trust parameters. In another example, the recommendation system 04 may select only the participants that best meet the search criteria and eliminate the other participants from the recommended list.

In addition, although only one trust parameter, the delivery service of the participant, is illustrated in this example, it is noted that the recommendation system 04 is capable of evaluating participants based on more than one trust parameter. For example, "pricing information" of the rotary pump may be the other trust parameter considered. In one embodiment, the recommendation system 04 may select the participants based on an aggregate mean value of the trust parameters. Alternatively, the recommendation system 04 may give priority to a participant who can deliver the product timely rather than one providing the best price. Indeed, more complex analysis and selection criteria may be included in the recommendation system 04. Therefore, the recommendation system 04 may present or select the participants based on additional rules and regulations provided by the user.

Figure 3:
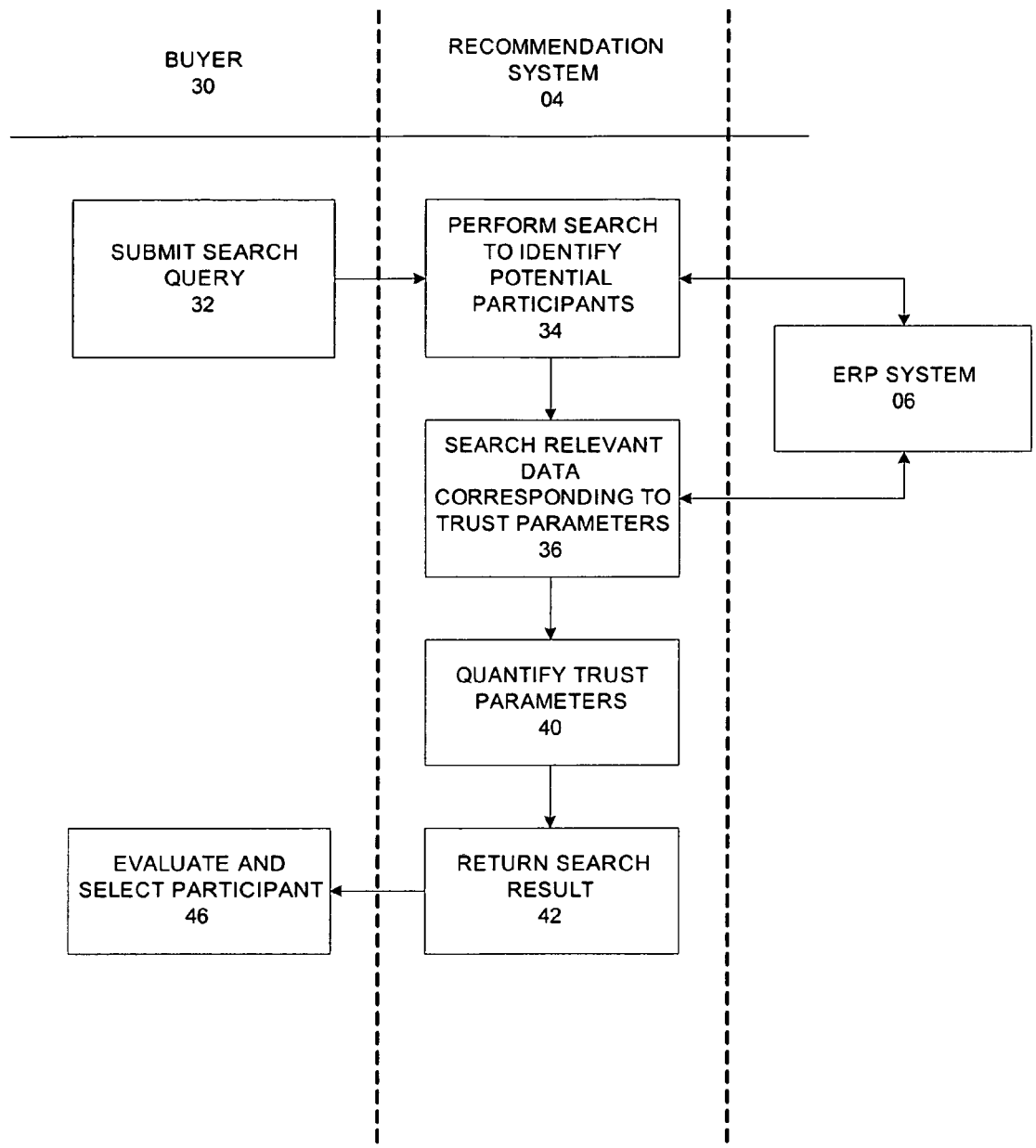
FIG. 3 is an interactive flow diagram illustrating the processes for providing a list of recommended participants in accordance with one exemplary embodiment of the invention.

FIG. 3 is an interactive flow diagram illustrating the process of providing a list of recommended participants in accordance with one exemplary embodiment of the invention. The process begins at block 32 with the buyer 30 submitting a search query to the recommendation system 04. In this example, the buyer 30 needs to purchase a server computer and requires the server computer to be delivered immediately. In addition, the quality of the server computer is important as critical applications will be run on the server computer. Accordingly, the search query includes information related to "sever computer", "timely delivery" and "product quality".

In response to the search query, the recommendation system 04 performs a search query on the ERP system 06 to locate potential suppliers who provide server computer (block 34). In one example (not illustrated), the recommendation system 04 may perform a search query on other system (such as the trust management system 04 or other resources 10 as illustrated in FIG. 1) to discover a list of potential suppliers. This list may be used to confirm the potential suppliers that are also recorded in the ERP system 06. Stated differently, the recommendation system 04 locates a list of potential suppliers from other systems and only proceed with known suppliers who have an established transaction record in the ERP system 06.

Next (block 36), the recommendation system 04 locates from the ERP system 06 the relevant data or transaction logs relating to the trust parameters representing the delivery service of the suppliers and the product quality. As described earlier, various search algorithms may be employed to extract the relevant transaction logs. In addition, the search may be performed based on an extended list of terminologies associated with the search query.

Once the transaction logs have been discovered, the recommendation system 04 further quantifies the trust parameters (block 40). In one example, the transaction logs show that Company A has a record of 5 successful timely deliveries and 3 delayed deliveries while Company B has a record of 5 successfully timely deliveries and 7 delayed deliveries. Employing Beta distribution function, the computed trust parameters for Company A and Company B are (0,3) and (0,7) respectively. It will be noted that other means of computation may be employed. For example, if the absolute information about the actual days required for delivery is important, weighted factors may be included in the computation.

The recommendation system 04 returns the search result at block 42. In one embodiment, the recommendation system 04 ranks the recommended participants based on the computed trust parameters prior to returning the search result (not illustrated). In this example, Company A may be recommended over Company B based on the trust parameter associated with the property of timely delivery. In another example, the recommendation system 04 may recommend Company B instead of Company A if the trust parameter of cheaper pricing is more significant to the buyer 30. Alternatively, the recommendation system 04 may compute a mean value representing the two trust parameters, that is timely delivery and pricing. Stated differently, the recommendation system 04 can be highly customized to provide a list of recommended participants according to the requirements of the buyer 30.

The process is completed at block 46 where the buyer 30 evaluates the search result and selects the participant. It will be noted that the actual evaluation and selection of the participant may be provided by the recommendation system 04 (not illustrated). That is, instead of returning a list of recommended participants, the recommendation system 04 provides the buyer 30 with the participant that best meets the selection requirements.

Thus, a method and system for automatically selecting participants in an on-line collaborative environment has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. In a participant selection system communicatively coupled with one or more trusted authorities for which information integrity of the one or more trusted authorities is maintained through each of the one or more trusted authorities restricting involvement from a general public and being maintained either privately by an organization or maintained by a trusted third party, a computer-implemented method comprising:

receiving, at the participant selection system, selection information from the one or more trusted authorities associated with a plurality of participants of a collaborative process, wherein the selection information comprises prior transaction data including one or more prior transactions associated with each of the plurality of participants;

identifying, at the participant selection system, a potential list of participants among the plurality of participants based on the selection information from the one or more trusted authorities;

deriving, at the participant selection system, one or more trust parameters from the one or more prior transactions associated with each participant among the potential list of participants, wherein each of the one or more trust parameters algorithmically quantify a projected future measure of trustworthiness of each of the potential list of participants in a potential transaction with the organization; and recommending, from the participant selection system, a participant from among the potential list of participants based on the one or more trust parameters.

2. The method of claim 1, wherein identifying the potential list of participants comprises performing a search for the prior transaction data that matches the selection information and relates to profile information associated with the plurality of participants.

3. The method of claim 1,
wherein the one or more trusted authorities comprise an Enterprise Resource Planning (ERP) system maintained either privately by the organization or maintained by the trusted third party; and
wherein deriving the trust parameters from the one or more prior transactions associated with each participant among the potential list of participants comprises identifying the trust parameters and quantifying the trust parameters from among one or more of a financial status of the plurality of participants, inventory management history of the plurality of participants, product quality history of the plurality of participants, and customer service history of the plurality of participants as represented in the ERP system.

4. The method of claim 1:
wherein receiving, at the participant selection system, the selection information from the one or more trusted authorities comprises receiving at a trust management unit of the participant selection system, the selection information from the one or more trusted authorities;
wherein identifying, at the participant selection system, the potential list of participants among the plurality of participants comprises identifying, at a recommendation unit of the participant selection system which is communicatively coupled with the trust management unit of the participant selection system, the potential list of participants among the plurality of participants; and
wherein deriving, at the participant selection system, the one or more trust parameters from the one or more prior transactions associated with each participant among the potential list of participants comprises deriving, at the recommendation unit, the one or more trust parameters from the one or more prior transactions associated with each participant among the potential list of participants.

5. The method of claim 1, wherein the trust parameters to algorithmically quantify the projected future measure of trustworthiness comprises applying one or more statistical algorithms against the one or more prior transactions associated with each participant from among the potential list of participants, the statistical algorithms comprising one or more of an Arithmetic mean, a Geometric mean, a Beta distribution function, and a Markov process.

6. The method of claim 5, further comprising ranking the potential list of participants according to the trust parameters.

7. The method of claim 1, wherein the prior transaction data relates to prior collaboration processes between the organization and the plurality of participants on the basis of at least qualifications or credentials of the plurality of participants.

8. The method of claim 7, wherein the information relating to at least the qualifications or credentials of the plurality of participants are provided by a trusted user among the one or more trusted authorities, the trusted user having participated in the prior collaboration processes.

9. A participant selection system in an organization, comprising:
a computer or machine interacting with a network;
an information module communicably interfaced with one or more trusted authorities having prior transaction data relating to prior collaboration processes between the organization and a plurality of participants, the prior transaction data describing one or more prior transactions associated with each of the plurality of participants;
a trust management module coupled with the information module to derive one or more trust parameters from the one or more prior transactions associated with each participant among the plurality of participants, wherein each of the one or more trust parameters quantify a future measure of trustworthiness for each of the plurality of participants in a potential transaction with the organization; and
a recommendation module coupled with the information module and the trust management module to recommend a participant from among the plurality of participants based on the one or more trust parameters associated with each of the plurality participants.

10. The system of claim 9, wherein the prior transaction data relates to prior collaboration processes between the organization and the plurality of participants on the basis of at least qualifications or credentials of the plurality of participants.

11. The system of claim 10, wherein the information relating to at least the qualifications or credentials of the plurality of participants are provided by a trusted user among the one or more trusted authorities, the trusted user having participated in the prior collaboration processes.

12. The system of claim 9, wherein the one or more trusted authorities comprise an Enterprise Resource Planning (ERP) system maintained either privately by the organization or maintained by a trusted third party.

13. The system of claim 12, wherein the trust management module to derive the trust parameters from the one or more prior transactions associated with each participant among the plurality of participants comprises identifying the trust parameters and quantifying the trust parameters from among one or more of a financial status of the plurality of participants, inventory management history of the plurality of participants, product quality history of the plurality of participants, and customer service history of the plurality of participants as represented in the ERP system.

14. The system of claim 13, wherein the trust parameters to quantify the future measure of trustworthiness comprises the trust management module to apply one or more statistical algorithms against the one or more prior transactions associated with each of the plurality of participants, the statistical algorithms comprising one or more of an Arithmetic mean, a Geometric mean, a Beta distribution function, and a Markov process.

15. The system of claim 9, further comprising ranking the plurality of participants according to the trust parameters.

16. A non-transitory machine-readable medium comprising instructions that, when executed by a machine, cause the machine to perform a method comprising:
receiving selection information from one or more trusted authorities associated with a plurality of participants of a collaborative process, the selection information comprising prior transaction data including one or more prior transactions between each of the plurality of participants and an organization;
identifying a potential list of participants among the plurality of participants based on the selection information from the one or more trusted authorities;
deriving one or more trust parameters from the one or more prior transactions associated with each participant among the potential list of participants, wherein each of the one or more trust parameters quantify a future measure of trustworthiness of each of the potential list of participants in a potential transaction with the organization; and
recommending a participant from among the potential list of participants based on the one or more trust parameters.

17. non-transitory machine-readable medium of claim 16, wherein identifying the potential list of participants comprises performing a search for the prior transaction data that matches the selection information and relates to profile information associated with the plurality of participants.

18. The non-transitory machine-readable medium of claim 16, wherein the one or more trusted authorities comprise an Enterprise Resource Planning (ERP) system maintained either privately by the organization or maintained by a trusted third party.

19. The non-transitory machine-readable medium of claim 18, wherein deriving the trust parameters from the one or more prior transactions associated with each participant among the potential list of participants comprises identifying the trust parameters and quantifying the trust parameters from among one or more of a financial status of the plurality of participants, inventory management history of the plurality of participants, product quality history of the plurality of participants, and customer service history of the plurality of participants as represented in the ERP system.

20. The non-transitory machine-readable medium of claim 16, wherein the trust parameters to quantify the future measure of trustworthiness comprises applying one or more statistical algorithms against the one or more prior transactions associated with each participant from among the potential list of participants, the statistical algorithms comprising one or more of an Arithmetic mean, a Geometric mean, a Beta distribution function, and a Markov process.

21. The non-transitory machine-readable medium of claim 20, further comprising ranking the potential list of participants according to the trust parameters.

22. The non-transitory machine-readable medium of claim 18, wherein the prior transaction data relates to prior collaboration processes between the organization and the plurality of participants on the basis of at least qualifications or credentials of the plurality of participants.

23. The non-transitory machine-readable medium of claim 22, wherein the information relating to at least the qualifications or credentials of the plurality of participants are provided by a trusted user among the one or more trusted authorities, the trusted user having participated in the prior collaboration processes.

* * * * *